May 16, 1939.    J. G. TAYLOR    2,158,092
FLAP AND AILERON CONTROL SYSTEM
Filed Dec. 7, 1936    3 Sheets-Sheet 3
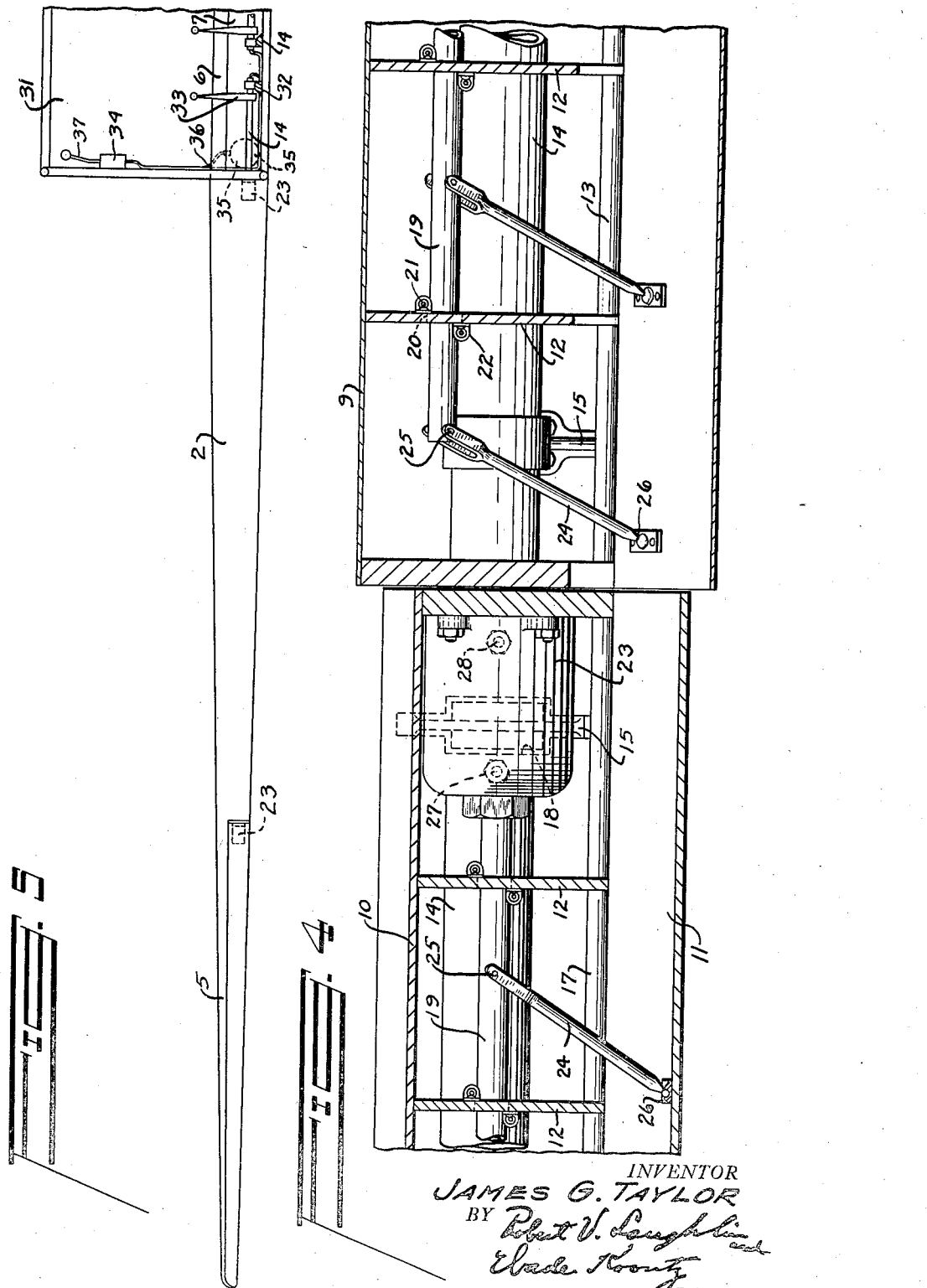
INVENTOR
JAMES G. TAYLOR
BY
ATTORNEYS Patented May 16, 1939

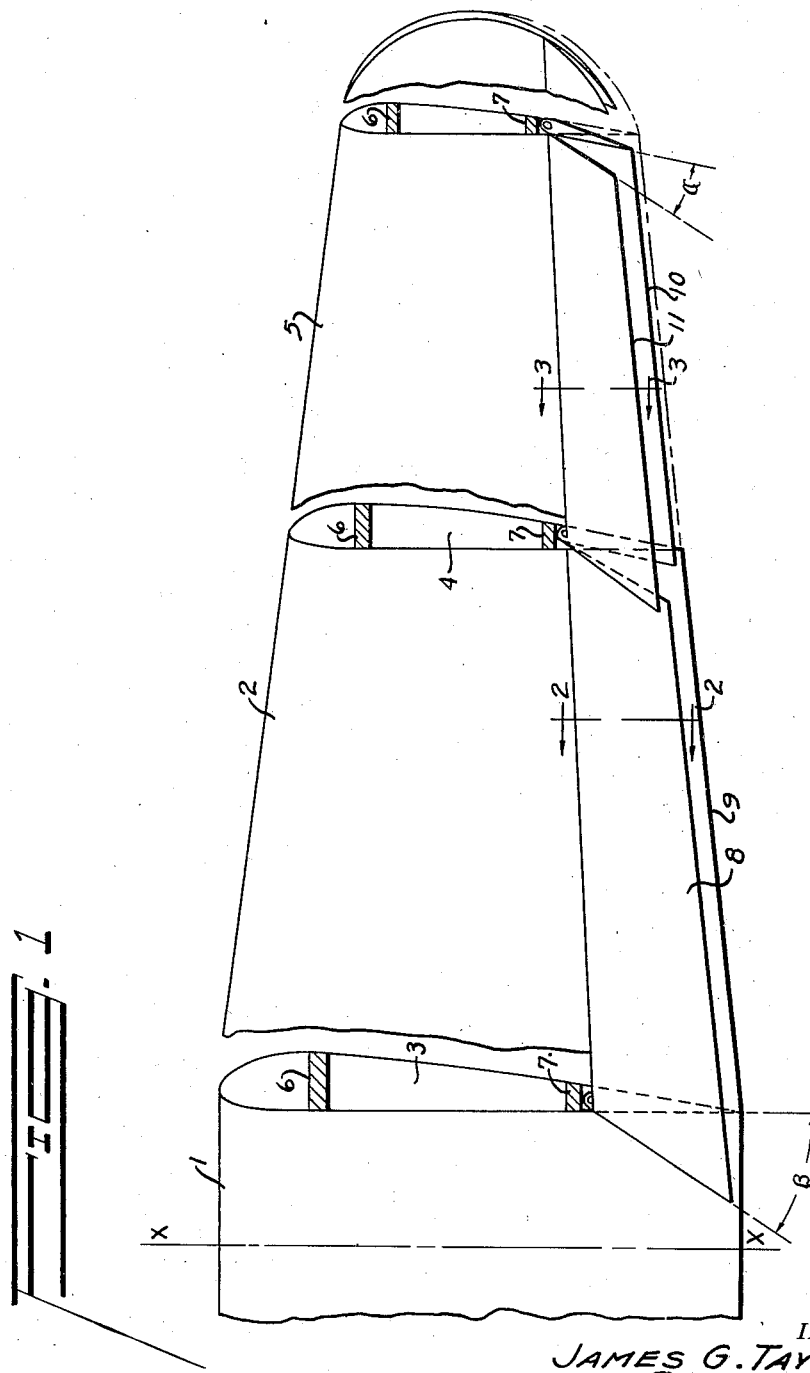

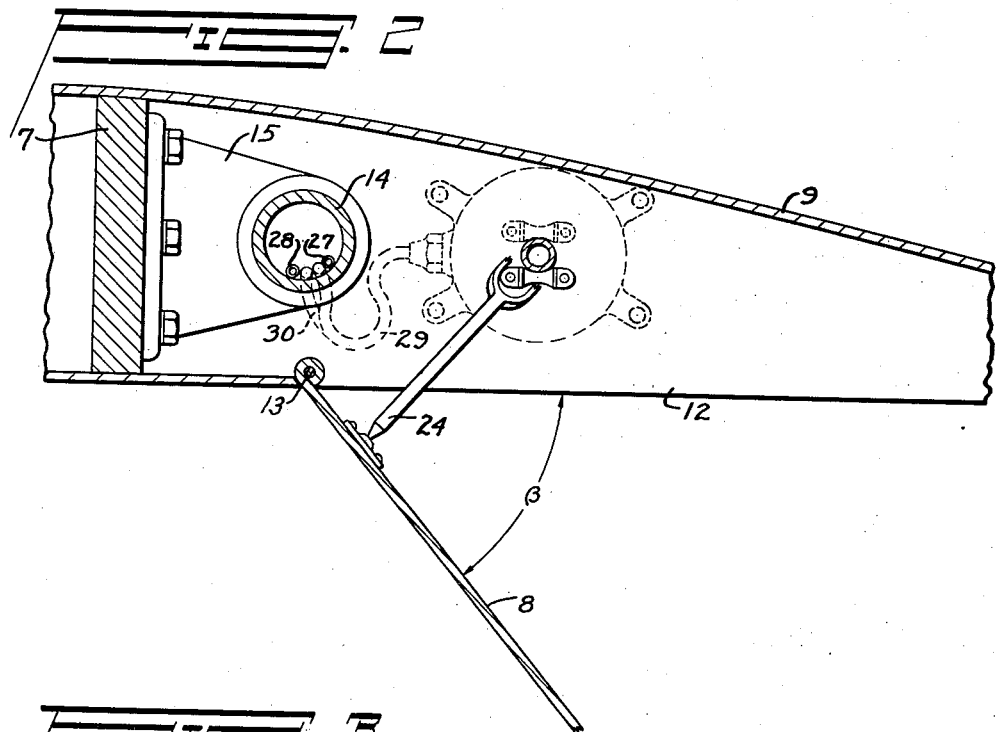
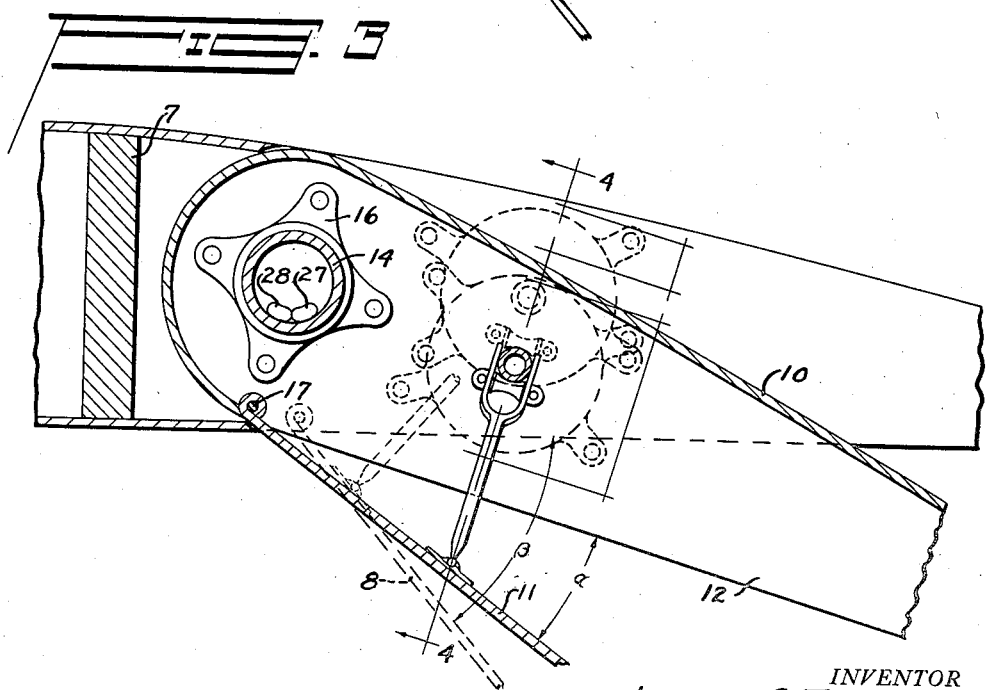

2,158,092

UNITED STATES PATENT OFFICE 2,158,092

FLAP AND AILERON CONTROL SYSTEM

James G. Taylor, San Rafael, Calif.

Application December 7, 1936, Serial No. 114,648

3 Claims. (Cl. 244—42)

(Granted under the act of March 3, 1883, as amended April 30, 1928; 370 O. G. 757)

The invention described herein may be manufactured and used by or for the Government for governmental purposes, without the payment to me of any royalty thereon.

My invention relates to aircraft and more particularly to improvements in the arrangement of flaps installed at the aft portion of the main lifting surfaces thereof.

To obtain the highest utility with flap arrangement, the flaps should be coextensive with the over-all spans of the main surfaces to which they are attached. Such extension, however, has never heretofore been proposed by aircraft designers due to persistence of a belief that trailing edge flaps must be foreshortened in order to provide space for the ailerons, usually at the outer rear portions of the main lifting surfaces.

Combinations have been devised wherein substantially rectilinear ailerons have been hinged to the flaps in cut-outs in the flaps and wherein acute angled ailerons have been hinged on bias or skew, swingable independently about a slanting axis, mounted on a swingable trailing edge flap adjustable about an axis substantially normal to the line of flight. Neither of the foregoing expedients have proven wholly satisfactory, since, in the first, the aileron ends moving with respect to the flaps allow end losses which detract considerably from the effectiveness of the flap and, in the second expedient, the area represented by the skewed ailerons is entirely lost insofar as flap area is concerned.

It is an object of my invention to provide not only the trailing edge portions of the main lifting surface of aircraft with flaps, but also to hinge and thereby make independent of the upper surfaces the entire lower surfaces of ailerons installed upon said aircraft.

With the foregoing and other objects in view, which will appear as the description proceeds, the invention consists of certain new and novel improvements in flap and aileron control systems which will be hereinafter more fully illustrated and described in the accompanying drawings and more particularly pointed out in the appended claims.

In the drawings:

Fig. 1 shows one half of the under side of the main lifting surface of an aircraft with outer tip tilted approximately forty-five degrees towards the observer;

Fig. 2 is a fragmental view, in cross-section, taken on the line 2—2 of Fig. 1;

Fig. 3 is a fragmental view, in cross-section, taken on the line 3—3 of Fig. 2;

Fig. 4 is a fragmental view, in partial cross-section, taken on the line 4—4 of Fig. 3; and Fig. 5 shows the left half of the main lifting surface of Fig. 1, including a fuselage fragment extending aft thereof.

In Fig. 1, a one-half plan view of the under surface of a tapered internally braced monoplane wing has been rotated about the axis of symmetry $x$—$x$ of the wing as a whole until said under surface is tilted at approximately forty-five degrees to the observer. That part of the wing shown comprises a straight (central) portion 1, a tapered (inner) portion 2 extending from section 3 at the root thereof to section 4 at the tip or point of trailing edge termination, and a tapered (outer) portion 5 extending from section 4 to the outer tip of said wing. A front spar 6 and a rear spar 7, as well as the major upper and lower surfaces of the wing proper, are continuous throughout the wing span.

It will be noted in Fig. 1 that the wing under surface, between sections 3 and 4 and aft of the rear spar 7, is cut away to permit installation of a trailing edge flap 8. The flap 8 is shown at an angle beta (approximately fifty degrees) with respect to the aforesaid cut-away surface of its supporting trailing edge 9.

An aileron 10 is secured to the rear spar 7 of tapered wing portion 5 by means of suitable hinge brackets (shown in Fig. 2). The lower surface of the aileron 10 is cut away to permit installation of an aileron flap 11. The flap 11 is shown at an angle alpha (approximately twenty degrees) with respect to the cut-away surface of the aileron 10. Through the above arrangement, continuous flap surface is provided from section 3 to the outer tip of tapered wing portion 5. It is quite obvious that similar flap surface may be provided for the straight wing portion 1 without departing from the spirit of my invention.

In Fig. 2, the trailing edge 9 of the tapered wing portion 2 is provided with ribs 12. The lower surface thereof terminates in a hinge 13 to which is secured the leading edge of the flap 8. An aileron torque tube 14 is secured to the rear spar 7 by means of a bracket 15. The actuating means for the trailing edge flap 8 is discussed in the description of Fig. 4.

In Fig. 3, the aileron 10 is provided with ribs 12 fixed to the torque tube 14 by means of brackets 16. The bottom portion of the leading edge of the aileron 10 terminates in a hinge 17 to which is secured the leading edge of the flap 11. The aileron leading edge is further provided with slots (shown in Fig. 4) for installation of further brackets 15 secured to the rear spar 7. The actuating means for the aileron flap 11 is discussed in the description of Fig. 4.

In Fig. 4, the observer looks forward from the sectional lines 4—4 of Fig. 3 into the interior of both aileron and trailing edge, two rib sections to either side of their junction. An identical set of operating mechanisms is provided for left and right aileron flaps and left and right trailing edge flaps. A master push rod 19 extends substantially the lateral span of each flap, all of the ribs 12 being provided with openings 20, rollers 21 and roller brackets 22. Each master rod 19 is driven laterally by a fluid pressure motor 23, operatively connected to like pairs of pressure lines 27—27, 28—28, 29—29, and 30—30, encased within the torque tubes 14, as shown in Figs. 2 and 3. Auxiliary push rods 24 are secured at their upper ends by pins 25 (to master rods 19) and at their lower ends by ball and sockets 26 (to flaps 8 or 11, respectively). It will be noted that the ball and sockets 26 installed upon the flaps 8 have been moved close to the hinge 13 to cause increased flap movement with like movement of all of the master rods 19. As the rods 19 recede within the motors 23, the flaps 8 or 11 are drawn shut and, conversely, extension of the rods from the motors 23 will affect opening of the flaps 8 or 11.

In Fig. 5, the torque tubes 14 emerge within a fuselage 31. They are secured to the bottom portion thereof by means of brackets 32 and are further provided with torque arms 33 adapted to be operably connected to the aileron control mechanism of the aircraft. The duplicate pairs of pressure lines 27, 28, 29 and 30 emerge from the open ends of the torque tubes 14 and are led across the bottom portion of the fuselage 31 and up the left-hand side thereof into a common control 34. The control 34 is connected to a fluid pressure supply 35 by means of a pressure line 36. Forward movement of a lever 37 of the control 34 simultaneously opens all flaps; aft movement thereof simultaneously closes the same.

What I claim is:

1. In an aircraft structure, a wing having, in combination, controllable wing tip trailing edge ailerons, an aileron control torque tube system including hollow torque tubes, a hinged flap on the underside of each aileron, a hinged flap on the under side of the wing portion inboard of the ailerons, a motor within each aileron, a motor within the inboard portion of the wing, a linkage connection between each motor and the subjacent flap and operable upon actuation of the motor to move the flap about its hinge axis, a single source of energy, transmission lines connecting the source of energy with the several motors and between the connections being encased in the hollow torque tubes, and means for controlling the transmission of energy through the said transmission lines.

2. In an aircraft structure, a wing having controllable split flap ailerons, a wing flap on the underside of the wing portion inboard of the ailerons, separate connecting linkage between each aileron and its flap and between the wing and the wing flap and operable to deflect the said flaps about their respective flap-axes, the connecting linkage between the wing and wing flap effecting a deflection of the wing flap greater than the deflection of the aileron flap for the same magnitude of operation of all the linkages, and means interconnecting the said linkages and actuatable to simultaneously operate the same.

3. In an aircraft structure, a wing having controllable split flap ailerons near the wing tips and a hinged flap on the underside of the wing portion inboard of the ailerons, connecting linkage between each aileron and its flap and between the wing and its flap respectively, and common actuating means interconnecting all the said linkages to simultaneously operate the linkages to deflect the said flaps on their hinges.

JAMES G. TAYLOR.